United States Patent

Okoshi et al.

[15] 3,639,857

[45] Feb. 1, 1972

[54] PLANAR-TYPE RESONATOR CIRCUIT

[72] Inventors: Takanori Okoshi, Tokyo; Masatoshi Migitaka, Kodaira, both of Japan

[73] Assignee: Hitachi, Ltd., Tokyo, Japan

[22] Filed: July 30, 1970

[21] Appl. No.: 59,548

[30] Foreign Application Priority Data

Aug. 1, 1969 Japan....................................44/60406

[52] U.S. Cl. ..............................331/107 R, 331/96, 331/99, 333/84 M

[51] Int. Cl. ..........................................................H03b 7/14

[58] Field of Search .........333/84 M; 331/107 G, 107, 107 T, 331/96, 99

[56] References Cited

UNITED STATES PATENTS

| | | | |
|---|---|---|---|
| 2,884,601 | 4/1959 | Kostriza et al | 333/84 M |
| 2,915,716 | 12/1959 | Hattersley | 333/84 M |
| 3,117,379 | 1/1964 | Ayer | 333/84 M |
| 3,448,409 | 6/1969 | Moose et al. | 333/84 M |

FOREIGN PATENTS OR APPLICATIONS

| | | | |
|---|---|---|---|
| 159,054 | 9/1954 | Australia | 333/84 M |

*Primary Examiner*—John Kominski
*Attorney*—Craig, Antonelli & Hill

[57] ABSTRACT

A planar-type resonator circuit comprising a conductive plate and a resonating conductive plate provided on said conductive plate in face-to-face fashion with a dielectric layer disposed therebetween, said resonating conductive plate having an input portion on one end and an output portion on the other end and also having decreasing widths towards the ends.

8 Claims, 8 Drawing Figures

PATENTED FEB 1 1972

3,639,857

INVENTORS

TAKANORI OKOSHI AND MASATOSHI MIGITAKA

BY Craig, Antonelli, Stewart + Hill

ATTORNEYS

PLANAR-TYPE RESONATOR CIRCUIT

BACKGROUND OF THE INVENTION

1. Field of the Invention

This invention relates to a planar type resonator circuit and more particularly to a planar type resonator circuit comprising one or two conductive plates and a resonating conductive plate facing said conductive plate or plates.

2. Description of the Prior Art

A transmission line comprising two conductive plates and a conductive plate of a two dimensional shape placed therebetween and a transmission line comprising one conductive plate and a facing conductive plate of two dimensional shape are well known as a triplate-type strip line and a microstrip line for use in the microwave and millimeter wave regions. Further, it is well known that a resonator or a filter can be made from such a transmission line by terminating the transmission line at a predetermined length (for example $\lambda/4$ or $\lambda/2$, $\lambda$ being the wavelength of a propagated wave).

Electron tubes such as the klystron and magnetron are conventionally used as millimeter wave or microwave generators. Recently, solid state oscillators have been developed for the advantages of their compactness, light weight and the simplification of the power source.

Such a solid state oscillator comprises a solid state oscillating element such as a Gunn diode or a IMPATT diode disposed in a cavity resonator serving as a three dimensional circuit element. However, the use of a cavity resonator is undesirable in a solid state oscillator from the viewpoints of size and weight.

Further, such solid state oscillators cannot be effectively used above the 10 gHz. region due to the limit of their output. This output limit often depends on the difficulty of providing a low impedance resonating circuit. Namely, letting the theoretical maximum output be $P$, frequency $f$ and the lowest practical resonating impedance $R_{min}$, the output $P$ is expressed by the following formula:

$$P \alpha \frac{1}{f^2 R_{min}} \quad (1)$$

Thus, for providing a large output $P$ in a solid state oscillator, a resonating circuit of relatively low impedance (below about 100Ω) becomes necessary. The use of a cavity resonator is undesirable for the difficulty of providing a low impedance resonating circuit. With a strip line or the like, the characteristic impedance of the line should be about 1/Q times the resonating impedance (here, Q being the Q value or quality factor of the line), i.e., below several ohms. To meet this requirement, a strip line resonating circuit having a very large width becomes necessary, which induces spurious modes, i.e., undesirable modes, in the neighborhood of the main oscillation frequency. Then, the separation of the desired main oscillation mode from the spurious modes becomes difficult.

SUMMARY OF THE INVENTION

An object of this invention is to provide a planar type resonator circuit capable of easily separating the main oscillation mode from spurious modes.

Another object of this invention is to provide a planar type resonator circuit capable of affording a large output by enabling the parallel operation of the oscillator element.

Further object of this invention is to provide a planar type resonator circuit capable of easily changing the oscillation frequency.

According to an embodiment of the invention, a planar type resonator circuit comprises a conductive plate and a resonating conductive plate provided on said conductive plate in face-to-face fashion with a dielectric layer disposed therebetween, said resonating conductive plate having an input portion on one end and an output portion on the other end and also having decreasing widths towards the ends.

DESCRIPTION OF THE PREFERRED EMBODIMENTS

Figure 1:
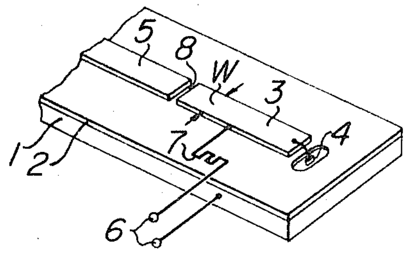
FIG. 1 PRIOR ART
FIGS. 1 and 2 are schematic diagrams of prior art solid state oscillator circuits employing a strip line.

In FIG. 1, a conventional resonator circuit comprises a conductive plate 1 (e.g., a copper plate), a dielectric layer 2 disposed on said conductive plate 1, and a resonating conductive strip line 3 (e.g., a copper plate) facing the conductive plate 1 and disposed on said dielectric layer. A solid state oscillator element 4 (e.g., Gunn diode) is connected to the conductive plate 1 at one end and to the resonating conductive strip line 3 at the other end. Here, the conductive plate 1 also serves as a heat sink for the solid state oscillator element 4. A strip shaped conductor 5 disposed on the dielectric layer in face-to-face fashion with the conductive plate 1 forms an output transmitting line with the plate 1. A DC bias voltage is applied to the solid state oscillating element 4 through terminals 6. A choke coil 7 allows a DC bias voltage to be applied to the conductive strip line 3, but prevents high-frequency energy generated in the resonator from leaking out of the resonator. Numeral 8 indicates the gap between the resonating conductive strip line 3 and the strip-shaped conductor 5, for example, the gap being 0.3 mm. Thus, this gap separates the conductors 3 and 5 in a DC sense, but transmits high frequency energy from the resonator to the output transmitting line.

The solid state oscillator shown in FIG. 1 is theoretically equivalent to an LC parallel resonating circuit in operation. Therefore, a description of the operation thereof is omitted but the drawbacks of an LC parallel resonating circuit are pointed out.

Figure 2:
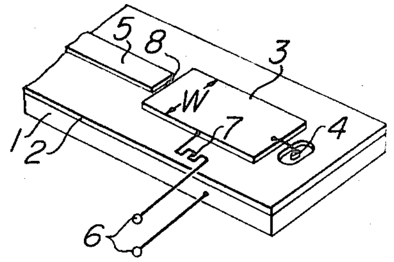
FIG. 2 PRIOR ART

As is known, the matching impedance for a solid state oscillator element is very small. Thus, for providing a large output from a solid state oscillator, a parallel resonating circuit having a relatively small impedance is necessary. For this purpose, the width of the conductive strip line 3 may be increased, as is shown in FIG. 2.

However, the increase in the width W of the resonating conductive strip 3 induces spurious modes, i.e., undesirable modes, in the neighborhood of the main oscillating frequency, which makes the separation of the main oscillating mode therefrom difficult, thereby disturbing stable operation and also increasing the losses in the circuit.

Figure 3:
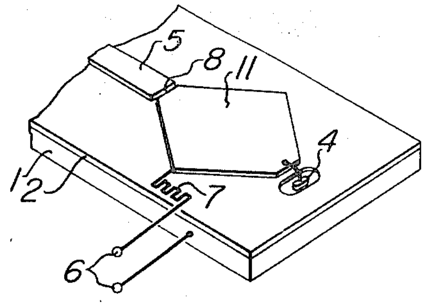
FIGS. 3 to 8 are schematic diagrams of the embodiments of the invention.

Now, the embodiments of the invention will be described. Through FIGS. 3 to 8, similar reference numerals indicate similar parts as those in FIGS. 1 and 2. In FIG. 3, a resonating conductive plate 11 has a unique shape, being different from that of the conventional strip line. Namely, the resonating plate 11 has a parallelogram shape with a pair of opposite corners removed, on one removed corner of which a solid state oscillating element 4 is provided and on the diagonally opposite removed corner an output portion is provided. In a planar circuit having such a configuration, high frequency oscillations of the fundamental mode, i.e., the dipole mode, may be generated. A DC bias voltage is supplied from one of the remaining two corners of said parallelogram conductor. At such a position the generated high-frequency voltages are smallest, reducing the influence on the high frequency oscillation to a minimum.

In such a planar type resonating circuit, it is experimentally confirmed that the main oscillation mode and the spurious modes are observed to lie at relatively separated positions in a frequency spectrum. Thus, it is easy to form a band pass filter which allows only the main oscillation mode to pass and remove spurious modes. Here, the separation of the main oscillation mode from spurious modes in the frequency spectrum becomes larger as the lengths of the four edges become equal. Especially, conductive plates of square shape are experimentally proved to be superior to other shapes. Further, using a Gunn diode in the above structure an output of 450 mw. is obtained at an oscillation frequency 10 gHz. and with a current flowing through the element 1.5 a. (applied through the terminals 6).

Figure 4:
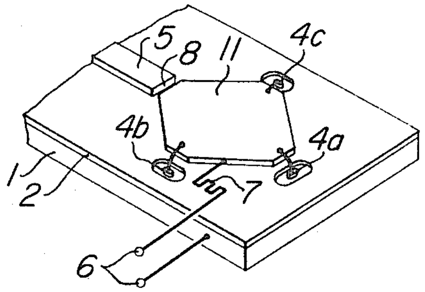

FIG. 4 shows a schematic structure of another embodiment in which three solid state oscillating elements *4a*, *4b* and *4c* are respectively connected to three corners of a parallelogram conductor 11 and a conductive plate 1 to enable the parallel operation of the oscillating elements. (In FIG. 4, the number of oscillating elements is three, but it may also be two). In this case the resonance mode is a quadrupole mode. In a quadrupole mode, the solid state oscillating elements are free from mutual interference. Further, the above structure is fitted for providing a large output by operating a plurality of solid state oscillating elements in parallel, since the output available from one solid state oscillating element is limited. For example, with three elements as above-mentioned an output as large as 750 mw. can be provided at an oscillation frequency of 10 gHz. by allowing a current of 3 a. to flow through terminals 6.

Figure 5:
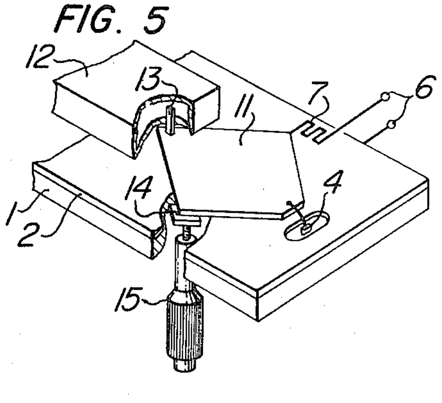

In FIG. 5, another embodiment of the invention is schematically shown in which a waveguide 12 is provided for deriving an output. An antenna 13 is provided on a planar resonating conductive plate 11, being coupled with the waveguide 12. This combination of a waveguide and an antenna serves as an output portion in this embodiment. In the preceding embodiments, an output portion comprises a combination of a planar resonating conductive plate 11 and a strip line 5 separated in a DC sense from and coupled in high frequencies with a planar resonating conductive plate 11. Further, in the preceding embodiments, the DC bias voltage applied to the solid state oscillating element may be altered to change the oscillating frequency, but such a method cannot provide a wide frequency variation. Thus, in the embodiment of FIG. 5 corresponding portions of the conductive plate 1 and the dielectric layer 2, facing the planar resonating conductive plate 11, are removed and a movable conductive piece 14 is provided thereat to make the capacity of the planar resonating circuit widely adjustable. The distance between the resonating conductive plate 11 and the movable conductive piece 14 is adjustable by a micrometer 15. Thus, the oscillating frequency can be widely adjustable.

Figure 6:
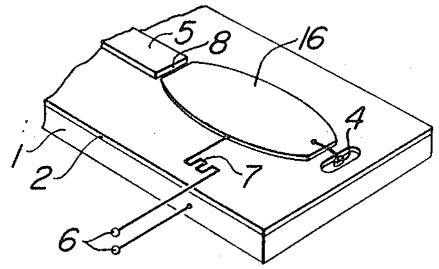

FIG. 6 shows yet another embodiment of the invention, in which an ellipse or circular resonating conductive plate 16 is provided on a conductive plate 1 in a face-to-face fashion to constitute a planar resonator. The purpose of this invention can be achieved by this ellipse or a circular conductive plate of this embodiment as well as by parallelogram conductive plates as is the case in the preceding embodiments. In fact, the substantial requirement for the planar type resonator of this invention is that the planar resonating conductive plate has a larger width in the middle portion and decreasing widths towards the ends, with a solid state oscillating element and an output portion provided on said ends diametrically opposite each other.

Figure 7:
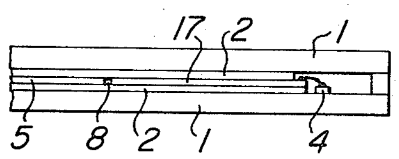

Further, although a planar resonating conductive plate is provided on a single conductive plate in opposing fashion, it may be disposed between two conductive plates. Such a structure is referred to as a triplate-type resonator and is illustrated in FIG. 7. In the figure, a planar resonating conductive plate 17 having a parallelogram, ellipse or circular shape is disposed between two conductive plates 1 through dielectric layers 2. For a triplate-type resonator, it is preferable to employ a triplate-type strip line for the output line as is shown at 5 in FIG. 7. Such a triplate-type planar resonating circuit has an advantage of decreasing the radiation loss of energy. It is apparent that the oscillation frequency can be widely changeable in this embodiment too by employing the structure of FIG. 5.

In the foregoing description, only the cases of solid state oscillator are described. However, it is apparent that this invention can be modified simply to a resonating circuit with an input portion provided in place of a solid state oscillating element. Such a resonating circuit is equivalent to a cavity resonator in its operation.

Figure 8:
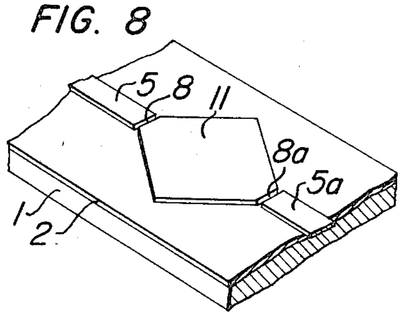

In FIG. 8, a resonator circuit having an input transmitting line including a strip shaped conductor **5*a* and a conductive plate 1 (in place of an oscillating element) is shown. The gap 8*a* between a resonating conductive plate 11 and a strip shaped conductor 5*a* separates the strip shaped conductor 5*a* from the conductive plate 11** in a DC sense but connects it to the conductive plate, i.e., a planar type resonating circuit, in the high-frequency range.

We claim:

1. A planar type resonator circuit comprising at least one conductive base plate, a dielectric layer disposed on said baseplate and a resonating conductive plate formed in a parallelogrammic shape provided on said dielectric layer, said resonating conductive plate being provided with at least an input and an output portion at diametrically opposite corners of said plate, and means for applying high-frequency energy to said input portion.

2. A planar type resonator circuit according to claim 1, wherein said means for applying high-frequency energy to said input portion includes a solid state oscillating element electrically coupled between a corner of said resonating conductive plate and said baseplate, said resonating conductive plate and said baseplate being provided with terminals for applying a DC bias voltage to said oscillating element.

3. A planar type resonator circuit according to claim 1, wherein one portion of said conductive baseplate adjacent said resonating conductive plate is removed and a movable conductor is provided in this portion in closely spaced relationship to said resonating conductive plate, whereby the distance between said movable conductor and said resonating conductive plate serves to adjust the resonant frequency of the resonator circuit.

4. A planar type resonator circuit according to claim 1, wherein said resonating conductive plate is provided between two conductive baseplates with respective dielectric layers disposed therebetween.

5. A planar type resonator circuit according to claim 2, wherein said resonating conductive plate is in the form of a parallelogram having a pair of opposite corners removed to form said input and output portions.

6. A planar type resonator circuit according to claim 5, wherein said resonating conductive plate is a square conductive plate having a pair of opposite corners removed.

7. A planar type resonator circuit according to claim 6, wherein said square-shaped resonating conductive plate is further provided with a solid state oscillating element at least at one of the remaining corners of said square.

8. A planar type resonator circuit according to claim 1, wherein said resonating conductive plate is formed in a square shape.

* * * * *